United States Patent
Ono et al.

[11] Patent Number: 5,961,600
[45] Date of Patent: Oct. 5, 1999

[54] METHOD AND APPARATUS FOR CONTROLLING DATA TRANSFER

[75] Inventors: Hiroshi Ono; Masahiro Fujii, both of Tokyo, Japan

[73] Assignee: NEC Corporation, Tokyo, Japan

[21] Appl. No.: 08/752,944

[22] Filed: Nov. 21, 1996

[30] Foreign Application Priority Data

Nov. 30, 1995 [JP] Japan ................................. 7-312393

[51] Int. Cl.⁶ ......................................................... G06F 15/16
[52] U.S. Cl. ............................ 709/228; 709/230; 709/237
[58] Field of Search ........................ 395/200.67, 200.66, 395/200.62, 200.6, 200.36, 200.37, 200.57, 200.58; 709/228, 230, 236, 237, 232, 227

[56] References Cited

U.S. PATENT DOCUMENTS 5,621,894 4/1997 Menezes et al. ................... 395/200.12
5,719,882 2/1998 Ellis ............................................ 371/33
5,764,919 6/1998 Hashimoto ......................... 395/200.06
5,781,743 7/1998 Matsuno et al. ................... 395/200.58

FOREIGN PATENT DOCUMENTS 0 566 895 A2  10/1993  European Pat. Off. .
2 271 253    4/1994   United Kingdom .
2 272 544    5/1994   United Kingdom .
2 288 954   11/1995   United Kingdom .

Primary Examiner—Stuart S. Levy
Assistant Examiner—Kenneth W Fields
Attorney, Agent, or Firm—McGinn & Gibb, P.C.

[57] ABSTRACT

A method and data transfer control unit for controlling a data transfer between a calling device and a called device, includes a first device for sending, from the calling device to the called device, a control signal for informing the called device of a data transfer format. A second device sends, from the called device to the calling device, a response signal for defining whether the data transfer format defined by the control signal has a predetermined state.

17 Claims, 7 Drawing Sheets

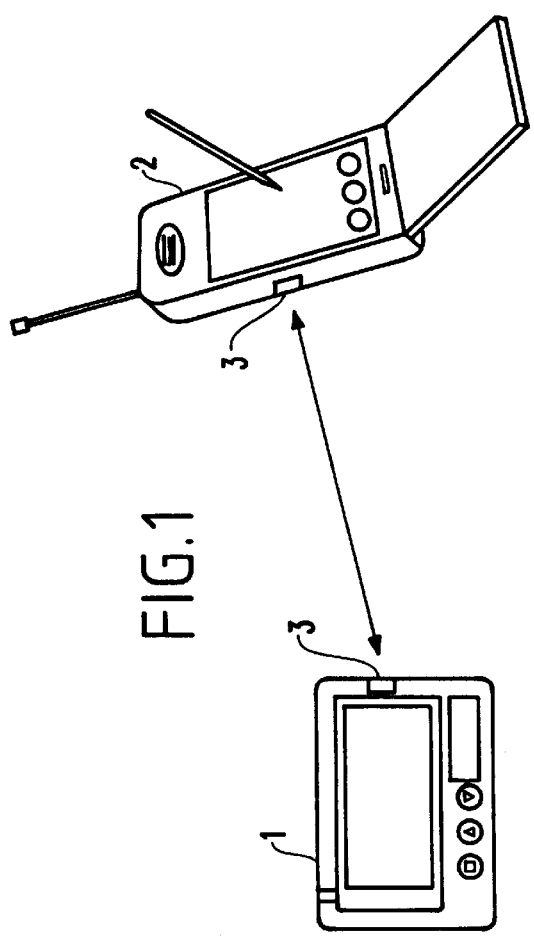
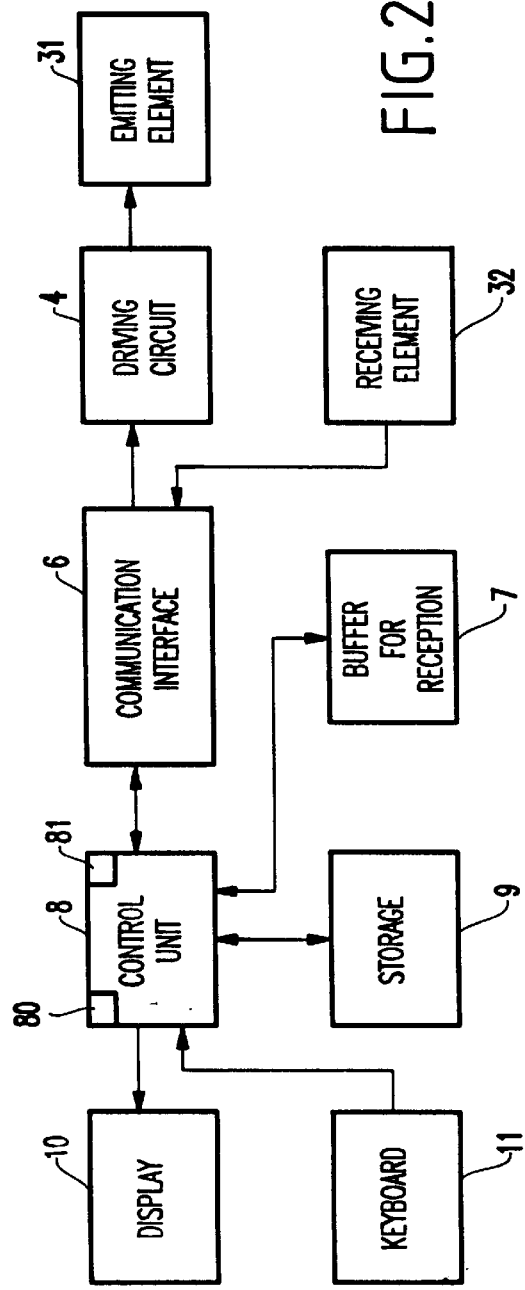

| FUNCTION | CODE |
|---|---|
| TELEPHONE DIRECTORY | TEL |
| SCHEDULE | SCHE |
| FIXED FORM | CANN |

FIG.5

| ITEM | CODE |
|---|---|
| NAME | FNAM |
| PRONUNCIATION | HNAM |
| TELEPHONE NUMBER | TELN |
| ZIP CODE | MALN |
| ADDRESS | FADD |
| IMAGE | IMEM |

FIG.6A

| TRANSMISSION RANGE | CODE |
|---|---|
| PORTION OF DATA | "PART" |
| ENTIRE DATA | "ALL" |
| RANGE OF DATA | "SEP0196" |
| " | "SEP0196-" |
| " | "-SEP0196" |
| " | "SEP0196-SEP0196" |

FIG.6B

| RECEIVING PROCESSING | CODE |
|---|---|
| ADDITIONAL DATA | "ADD" |
| REPLACEMENT DATA | "REPLACE" |
| DELETION OF DATA | "DELETE" |

FIG.6C

| | | |
|---|---|---|
| START SIGNAL | PARAMETER | TERMINATION SIGNAL |

| PARAMETER | DEFINITION |
|---|---|
| OK | REQUEST IS MET |
| NG | ERROR OCCURS IN LOGICAL CHECK |
| CAN3 | TRANSMISSION RANGE CODE OR RECEIVING PROCESSING CODE IS UNACCEPTABLE |
| CAN2 | FUNCTIONAL CODE OR ITEM CODE IS UNACCEPTABLE |
| CAN1 | TRANSFER DIRECTION CODE IS UNACCEPTABLE |

"Title_#1", "Title_#2", ... , "Title_#m"   ITEM CODE
"DATA_11", "DATA_12", ... , "DATA_1m"   FIRST DATA
"DATA_21", "DATA_22", ... , "DATA_2m"   SECOND DATA "DATA_n0", "DATA_n1", ... , "DATA_nm"   NTH DATA

FIG.11A

"HNAM", "TELN"
"TARO NICHIDEN", "045-111-1111"
"JIRO NICHIDEN", "03-111-1111"
"HANAKO NICHIDEN", "044-111-1111"

FIG.11B

"Data_File_Name"         ···Data File      DATA FILE NAME
"Sub_File#1_Name"        ···Sub File#1     TITLE OF FIRST SUBFILE
          :
"Sub_File#n_Name"        ···Sub File#n     TITLE OF NTH SUBFILE

FIG.12A

"denwa.dat"
"kao1.bmp"
"kao2.bmp"

FIG.12B

METHOD AND APPARATUS FOR CONTROLLING DATA TRANSFER

BACKGROUND OF THE INVENTION

The present invention generally relates to a data transfer control unit and method therefor, and more particularly to a method and data transfer control unit for transmitting data using infrared (IR) rays or the like.

DESCRIPTION OF THE RELATED ART

Hitherto the invention, a data transfer control unit using IR rays has been employed in small electronic equipment such as an electronic notebook, a pocket computer, a radio selective calling receiver and the like. Generally, the input buttons and the display screen of such small electronic equipment are small in proportion to the main chassis/body of the equipment, and it is cumbersome to input thereto a large quantity of data, especially if the user's fingers are large in comparison with the input buttons.

Therefore, users typically input data to other electronic equipment such as a personal computer or the like, and then transfer the data to the small electronic equipment from the personal computer by infrared rays.

More specifically, the central processing unit (CPU) of the personal computer reads data inputted by a user of the computer from the computer memory. After the read data is converted into a predetermined communication format, it is converted to an infrared signal output by an IR emitter housed within the personal computer and is transmitted to the small electronic equipment.

The small electronic equipment converts the IR signal into an electric signal having a data format which can be stored in a memory by a receiver of the small electronic equipment. Subsequently, the converted data is stored in the memory by the CPU of the small electronic equipment.

Such a data transfer control unit is not limited to small electronic equipment but also can be applied, for example, to data transfer between personal computers. For example, a first device (the "calling equipment" or "Master") which starts communication, that is, a computer sending a control signal for requesting data transfer, calls. A second device (the "called equipment" or "slave") with which communication is started waits for data transfer from the calling equipment after receiving the control signal.

However, if an infrared signal is interrupted by a surrounding obstruction (e.g., the IR emitter's line-of-sight is obstructed such that the receiver does not receive the IR signal, or if the emitter is in a "noisy" environment), or the channel of an infrared signal is "uneven". Specifically, if the distance between IR devices is longer than an allowable distance (e.g., typically 1 meter or possibly even as small as one foot) or the angle to the receiver side IR unit is greater than an allowable value (e.g., more than 15 degrees from the center line), then the IR path is uneven because the small units are held by hand in most cases and thus cannot keep within its parameters. Thus, the conventional data transfer control unit cannot perform its control operation so that the receiver receives the infrared signal with a fixed intensity. Therefore, the communication quality of the received data is not fixed (stable), and the receiver cannot receive data correctly.

Further, since the receiver cannot detect the deteriorated (or poor) data transfer communication quality (even though the data has been transferred incorrectly), wrong data may be mistakenly processed as correct data.

Another problem of the conventional systems is that some data transfer equipment is predetermined (e.g., the conventional systems should predetermine the contents list of data elements or order between the receiver and the transmitter sides to communicate successfully the data), and data cannot be transferred to other freely selected equipment.

Further, since the order of sending data (or the contents of the sent data) for determining data processing by electronic equipment which receives the data must be predetermined, the conventional systems lack versatility.

Furthermore, even if the receiver requires only a portion of the data, the transmitting equipment must send all of the data, and thus data a transfer is lengthy and sometimes unnecessary data is sent.

Similarly to electronic equipment requesting data transfer by sending a control signal, data transfer cannot be started when the calling equipment does not (or cannot) receive a response signal in response to the control signal previously sent. Thus, a control signal is required to be resent repeatedly for data transfer in a poor communication environment.

Further, when a portion of data should be synchronized between both receiver and transmitter sides, if the portion of data is specified by a unique ID assigned at each side, it might be erroneously matched because of accidental duplication of ID assignment. As a result, either data must be erased during a synchronization process. Hence, the unique ID should be changed when data is changed otherwise problems occur.

SUMMARY OF THE INVENTION

In view of the foregoing problems of the conventional systems, an object of the present invention is to provide a data transfer control unit for overcoming the problems of the conventional data transfer control unit.

Another object of the present invention is to provide a data transfer control unit for sending a signal for informing data transmitting equipment (e.g., a transmitter) that reception is impossible if data receiving equipment (e.g., a receiver) cannot receive data correctly due to a communication line failure.

Yet another object of the present invention is to provide a data transfer control unit for establishing a transfer format by sending a control signal for defining a data transfer format, prior to data transfer, and receiving a response signal in response to the control signal issued by the calling (Master) equipment.

Another object of the present invention is to provide a data transfer control unit for transferring only data required by the receiver.

A further object of the present invention is to provide a data transfer control unit which controls data transfer so that a data transmitter stops data transfer, if a data receiver receives wrong data (or receives no data) a predetermined number of times due to a communication line failure while data is being transferred. For example, when only the beginning (e.g., the first 10 bytes) of a data transfer can be received, but not the following data (e.g., the following 50 bytes), in a predetermined time frame, the receiver side recognizes that there is no data transfer.

To achieve the above-described and other objects, a data transfer control unit according to the present invention performs a control operation such that equipment which starts communication (e.g., "the calling equipment" or the "Master") sends a control signal for informing a data transfer format to equipment with which communication is started ("the called equipment" or the "slave"). The called equipment outputs a response signal for defining whether the transfer format defined by the control signal is acceptable to the calling equipment.

Further, with the present invention, if the calling equipment does not receive a response signal within a predetermined time, the control signal is resent by the calling equipment a predetermined number of times to the called equipment.

Additionally, with the present invention, an item code for defining the meaning of transferred data is sent prior to data transfer.

In a first aspect of the invention, a data transfer control unit and method are provided for controlling a data transfer between a calling device and a called device, which includes first means for sending, from the calling device to the called device, a control signal for informing the called device of a data transfer format, and second means for sending, from the called device to the calling device, a response signal for defining whether the data transfer format defined by the control signal has a predetermined state.

With the unique and unobvious structure and method of the invention, a data transfer control unit prevents wrong data from being transferred by the interruption of communication (or faulty communication) during data transfer between equipment before completion of a file transfer.

The calling equipment sends a control signal for informing a data transfer format to the called equipment, and the called equipment sends a response signal, defining whether the transfer format defined by the control signal is acceptable, to the calling equipment. Thus, the data transmitter is timely informed that reception is impossible due to the data receiver not receiving (or not being able to receive) data correctly due to a communication line failure.

Further, the data transfer control unit transfers only data required by electronic equipment, and the data transfer control unit controls the data transmitter so as to stop its data transfer, if the data receiver receives wrong data a predetermined number of times due to a communication line failure.

BRIEF DESCRIPTION OF THE DRAWINGS

The foregoing and other objects, aspects and advantages will be better understood from the following detailed description of a preferred embodiment of the invention with reference to the drawings, in which:

FIG. 1 illustrates an example of electronic equipment to which a data transfer control unit according to the present invention is preferably applied;

FIG. 2 is a functional block diagram showing the data transfer control unit according to the present invention;

FIG. 5 illustrates an exemplary correspondence between a function according to the present invention and the functional code;

FIG. 6(A) illustrates an exemplary correspondence between an item according to the present invention and the item code;

FIG. 6(B) illustrates an exemplary transmission range code section of the exemplary response signal according to the present invention according to the present invention;

FIG. 6(C) illustrates an exemplary receiving processing code section of the exemplary response signal according to the present invention according to the present invention;

FIGS. 11(A)–11(B) illustrate a transfer based upon an item code according to the present invention; and FIGS. 12(A)–12(B) illustrate a transfer based upon a data file name according to the present invention.

DETAILED DESCRIPTION OF A PREFERRED EMBODIMENT OF THE INVENTION

Figure 3:
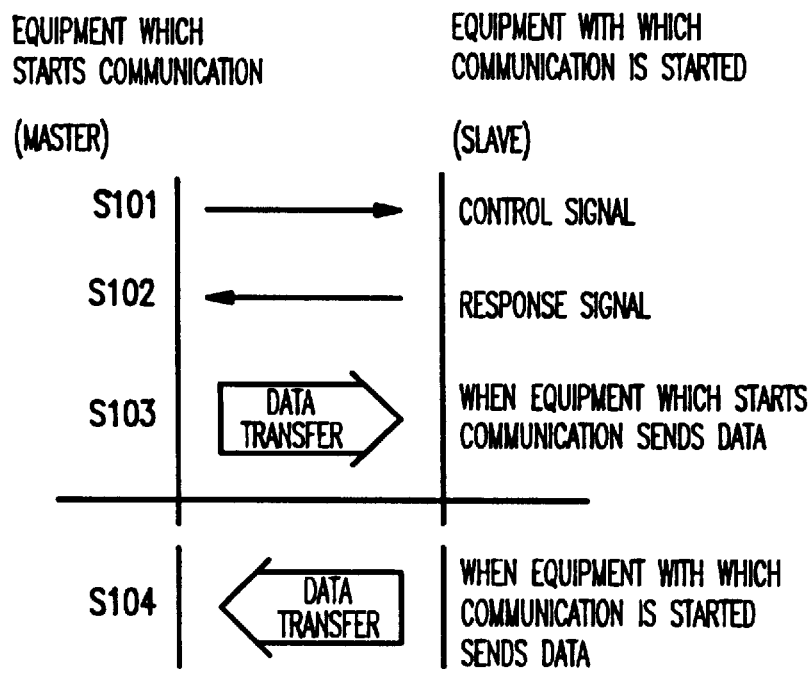
FIG. 3 is a diagram showing a communication procedure for data transfer according to the present invention.

Referring now to the drawings, and more particularly to FIG. 1, which illustrates exemplary electronic equipment to which a data transfer control unit and method according to the present invention is applied, an infrared (IR) ray sending/receiving window 3 is provided in first and second electronic devices 1, 2. It is noted while IR rays are used for the data transfer medium, electromagnetic waves (e.g., radio frequency) and wire communications also may be employed (alternatively or additionally).

An infrared ray emitter (not illustrated) and an infrared ray receiver (not illustrated) are provided inside the infrared ray sending/receiving window 3 of each of the electronic devices 1, 2, the circuitry of which is known by one ordinarily skilled in the art. In FIG. 1, the first electronic device 1 and the second electronic device 2 are, for example, a radio selective calling receiver and a mobile telephone, respectively.

An infrared signal generated by the emitter of the first electronic device 1 is received by the receiver of the second electronic device 2. Conversely, an infrared signal generated by the emitter of the second electronic device 2 is received by the receiver of the first electronic device 1. Thus, communication therebetween is achieved.

FIG. 2 is a functional block diagram showing a data transfer control unit according to the present invention, which preferably is provided in both the sending apparatus and the receiving apparatus, otherwise the advantages of the invention will not be optimized. Thus, both sides should have the same blocks and the IR protocol is two-way.

The data transfer control unit of the invention includes, for example an emitting element 31 (e.g., "emitter"). The emitter 31 preferably includes, for example, an infrared diode and a lens to focus, and a communication interface 6 modulates a serial digital signal to a pulse, in a manner known by those ordinarily skilled in the art, and outputs the pulse to a driving circuit 4. The emitting element 31 issues an infrared signals according to the driving voltage of the driving circuit 4. The infrared signals are output to another electronic device. Preferably, the interface 6 is formed by a parallel-to-serial converter, a data modulator to form the pulses, a receiver filter to eliminate noise, a demodulator to convert pulse signals to serial signals and a serial-to-parallel converter, whereas the driving circuit 4 preferably comprises an amplifier. The data modulator for forming the pulses is useful for IrDA protocol and TV remote control signals.

A receiving element (e.g., "receiver") 32, which includes, for example, a phototransistor and a lens to focus, an optical filter tuned to infrared frequencies, receives a pulsed infrared signal from the counterpart electronic device, and outputs it to the communication interface 6 which in turn converts it into a serial digital signal.

The driving circuit 4 includes a plurality of transistors (preferably an arrangement of resistors and capacitors), arranged in a manner known to one of skill in the art, and drives the emitter 31 according to a signal from the communication interface 6, thereby to control the pulses of the emitter 31.

The communication interface 6 converts a parallel digital signal from a control unit 8 into a serial digital signal and then modulates the serial digital signal to a pulse, in a manner known in the art, and drives the driving circuit 4. The serial digital signal preferably includes 8 bits, but of course other bit lengths also may be employed. The control unit 8 preferably comprises a general-purpose microprocessor, such as a Z80, 8-bit processors or other processors. Further, the control unit 8 includes a timer 80 and a counter 81 discussed in further detail below and either provided in the control unit 8 or coupled thereto). Further, a display driver (not illustrated) is provided for driving the display 10.

The communication interface 6 also demodulates pulse signals from receiver 32 and then into a parallel signal, and outputs it to the control unit 8.

A receiving buffer 7 temporarily stores a received parallel digital signal from the control unit 8, while an infrared signal is being received by the receiver 32. The buffer 7 preferably is formed by a first-in-first-out buffer memory (e.g., 8-bits may be input to/from a UART buffer).

An output device, such as a keyboard, trackball, light pen, "joystick" 11, or the like outputs the contents of data, a control signal described below, an item code or a file name to be sent which is input by a user via the output device to the control unit 8.

A display 10 receives data from the control unit 8. The display 10 is preferably a cathode ray tube (CRT), a liquid crystal display (LCD), a printer, or the like, and is driven by a display driver (not illustrated) in the control unit 8.

A storage 9 stores data to be sent, data received, a control signal, an item code, a file name and a response signal described below. Preferably, the storage 9 is formed of a memory which may be rewritable, and which may include a magnetic media (e.g., hard disk, a floppy disk, etc.) or an optical media.

The control unit 8 controls the keyboard 11, the display 10, the storage 9, the receiving buffer 7 and the communication interface 6, and generates a signal to be sent to another electronic device from the electronic device. The control unit 8 further outputs the signal as a parallel digital signal to the communication interface 6. Also, the control unit 8 stores a parallel digital signal from the communication interface 6 in the storage 9 or the receiving buffer 7, and displays it on, for example, a screen of the display 10.

Hereinbelow, the operation of the data transfer control unit shown in FIG. 2 will be described. First, a data transmitting operation will be described. Specifically, if data is transferred to another electronic device (e.g., "the called equipment" or "the called device"), data from the keyboard 11 is output to the control unit 8.

The control unit 8 stores the data input from the keyboard 11 in the storage 9, converts it into a parallel digital signal and outputs it to the communication interface 6. The communication interface 6 converts the parallel digital signal from the control unit 8 into a serial digital signal (e.g., through parallel-to-serial converting circuitry) and then modulates the serial digital signal to a pulse, and outputs it to the driving circuit 4.

The driving circuit 4 drives the emitter 31 by the serial pulse signal, and the emitter 31 sends an infrared signal to another electronic device.

Secondly, a data receiving operation will be discussed. Specifically, if data is received from another electronic device, the receiver 32 receives an infrared pulse signal and outputs the pulse signal to the communication interface 6. The communication interface 6 converts the pulse to a serial digital signal and then converts (e.g., through serial-to-parallel converting circuitry) the serial digital signal to a parallel digital signal and outputs the parallel digital signal to the control unit 8. The control unit 8 stores the parallel digital signal from the communication interface 6 in the receiving buffer 7, and displays it, for example, on the screen of the display 10.

When the receiver 32 has finished receiving an infrared signal, the control unit 8 outputs the parallel digital signal stored in the receiving buffer 7 to the storage 9 to save it therein.

Next, a data transfer procedure according to the present invention will be described referring to FIG. 3. In FIG. 3, an electronic device which starts data transfer, that is, sends a control signal is called "the Master" (also known as "the calling equipment" referred to above) and an electronic device which sends a response signal responsive to the control signal is called "the slave" (also known as "the called equipment" as referred to above).

First, in step S101 the master sends a control signal (the format of which is shown in greater detail in FIG. 4), and the slave returns a response signal (the format of which is shown in greater detail in FIG. 7) to the master in step S102. The subsequent data transfer format is determined by data exchange of these control and response signals.

If the master transmits data, then data is transferred to the slave in step S103. Alternatively, if the slave transmits data, then data is transferred to the master in step S104.

Figure 4A:
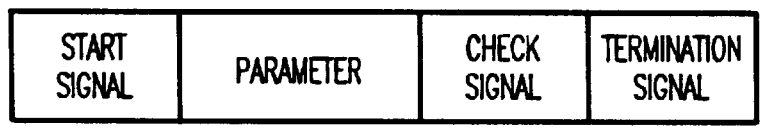
FIG. 4(A) illustrates a format of an exemplary control signal issued by a calling equipment.

Next, the contents of a control signal will be described referring to FIGS. 4(A) and 4(B). As shown in FIG. 4(A), a control signal, which may include 60 bytes, includes a start signal portion (header), a parameter portion, a check signal portion and a termination signal portion (tail). An exemplary control signal may appear as:

| Start Portion | Parameter Portion | Check Signal | Stop Signal |
|---|---|---|---|
| ********** | "...................." | SUM | ODh |
| 10 bytes | 48 bytes | 1 byte | 1 byte |

A start signal portion, preferably having 10 bytes, represents that the transmission of a control signal is started, and is provided at the beginning of the control signal.

Figure 4B:
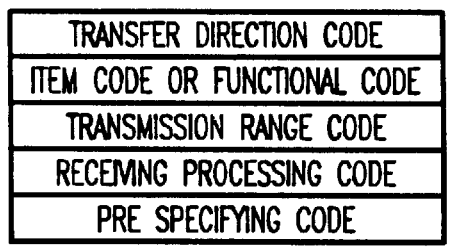
FIG. 4(B) illustrates an exemplary parameter (codes) section of the exemplary control signal according to the present invention.

A parameter portion, preferably having 48 bytes, follows the start signal, and, as shown in FIG. 4(B) for example, includes any of a transfer direction code, an item code or a functional code, a transmission range code, a receiving processing code and a PRE (e.g., previous) specifying code.

The transfer direction code defines which device has started communication (Master) and which equipment with which communication is started (slave) transmits data. Thus, a data transmission direction of Master to Slave or Slave to Master is indicated by the transfer direction code.

When "Master transmits" is specified for the transfer direction code (as represented by "0" or more specifically by "(30h)" which is the ASCII code for "0"), data in a file to be transferred is transmitted from the device which starts communication (the Master). Alternatively, when "Master receives" is specified for the code, data in a file to be transferred is transmitted from the slave.

The functional code defines the data of what function of a plurality of predetermined functional items is transmitted. These functions may comprise a telephone directory, a schedule, a list of fixed forms, a "to-do" list, a memo, or the like. For example, as shown in FIG. 5, the functional code comprises "TEL", "SCHE" and "CANN" corresponding to these functions and defines the above-described functions. For example, if the data of a function of a telephone directory is transferred, a functional code "TEL" is defined.

The item code can be used concurrently with the above-described functional code, or can be used individually, and defines the data of what item of predetermined data items is being transmitted. For example, these items may comprise a name, a telephone number, a zip code, an address, an image, a data update time, or the like. As shown in FIG. 6A the item code may comprise "FNAM", "HNAM", "TELN", MALN", "FADD" and "IMEM" corresponding to these items and defines these items. For example, if the name and telephone number data is transferred, the item code "FNAM and TELN" is defined. Thus, data of single items or of multiple items (combinations of codes) may be transferred and designed in the time code portion.

The transmission range code defines the range of data to be transmitted and defines a portion of the data, the whole data, data the input date of which is defined, newly cataloged data and others. For example, as shown in FIG. 6(B), the transmission range code may appear as "PART", "ALL", "SEP0196" or the like. For example, "SEP0196" defines a range of data by means of a time stamp (e.g., in this case a specific day). Additionally, a range of data from a selected data to the present date could be specified by the code of "SEP0196-" or all data up to a selected date (e.g., "-SEP0196"), or data from a selected date to a second selected date could be specified (e.g., "SEP0196-SEP0996").

The receiving processing code defines the processing for the equipment (Master or slave) which receives transferred data, and defines whether transmitted data is additional data, replacement data or deletion of data if data of the same function exists in memory of the above-described equipment, or if a file with the same name exists. For example, as shown in FIG. 6(C), the receiving processing code may appear as "ADD", "REPLACE", or "DELETE".

If transmitted data is additional data, new data is added to the corresponding data of a specified functional code or item code stored in the receiving equipment and stored.

If transmitted data is replacement data, the corresponding data of a specified functional code or item code stored in the receiving equipment is deleted and received data is newly stored.

If transmitted data is deletion of data, received data is compared with the corresponding data of a specified functional code or item code stored in the receiving equipment, matched (matching) data is deleted.

The PRE specifying code defines whether the file name of transferred data has been transmitted previously or not. If the code defines that the file name has been transmitted previously, then the file name(s) is transmitted before the data file(s). For example, the PRE specifying code may appear as "PRE=YES". In this manner, the receiver can know the names of the files before hand (e.g., before actual receipt thereof and before the data transfer has occurred). Further, the receiver can know the length of the data transfer and whether a file is missing upon transmission.

Referring back to FIG. 4(a), the check signal portion, preferably having 1 byte, is provided for making a logical check such as a parity check and equipment with which communication is started detects a deteriorated communication state by using the check signal. For example, if the sum from the start byte to the end byte in the parameter portion is "5Eh", then the check signal portion is "81h" (e.g., "5Eh" plus "81h" is "00h"). The termination signal is predetermined and shows the termination of a control signal. For example, the predetermined termination signal may appear as "0Dh" (CR or casual return code).

Figures 7A, 7B, 8:
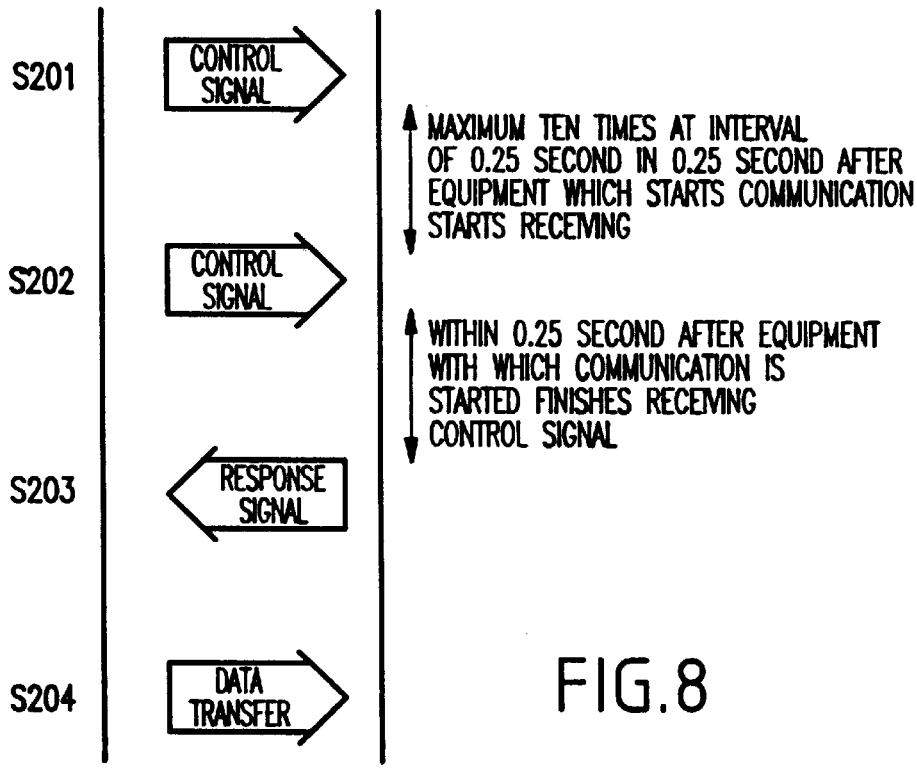
FIG. 7(A) illustrates a format of an exemplary response signal issued by a called equipment.
FIG. 7(B) illustrates an exemplary parameter (codes) section of the exemplary response signal according to the present invention according to the present invention.
FIG. 8 is a sequence diagram for illustrating a procedure for retransmitting a control signal according to the present invention.

Next, a response signal will be described referring to FIGS. 7(A) and 7(B). As shown in FIG. 7(A), a response signal includes a start signal, a parameter and a termination signal, and preferably has 6 bytes.

The start signal portion, which preferably includes 1 byte, is predetermined and shows the start of a response signal. An exemplary start signal could be represented by "*".

The parameter portion, which preferably includes 2 or 4 bytes, comprises for example an "OK", "NG", "CAN3", "CAN2" and "CAN1" signal, as shown in FIG. 7(B) for example.

The OK signal represents that a request in any format can be met in response to a control signal transmitted from calling equipment with a parameter comprising the transfer direction code, the functional code, the item code, the transmission range code and the receiving processing code which define a data transfer format.

The NG signal represents the result of a logical check which is executed by called equipment according to a check signal which is a control signal, and is included in a parameter if an error occurs in a logical check. For example, an error in a logical check may occur due to the check sum being erroneous.

The CAN3 signal represents that the character of data to be transferred which is defined by the transmission range code or the receiving processing code included in the parameter of a control signal, cannot be processed by the called equipment (slave).

The CAN2 signal represents that the data item to be transmitted which is specified by the functional code or the item code included in the parameter of a control signal, cannot be processed by the called equipment (slave). For example, if the specification of image data is included in the item code transmitted from calling equipment (Master) and called equipment (slave) cannot process the image data, "CAN2" is included in the parameter portion of the response signal.

The "CAN1" signal represents that a data transfer direction specified by the transfer direction code included in the parameter of a control signal is different from the direction of the called equipment (slave). For example, if the called (slave) equipment, requested to transmit data according to a transfer direction code transmitted from the calling equipment (Master), is provided with only a data receiving function, "CAN1" is included in the parameter portion of the response signal.

When the response signal (FIG. 7(a)) includes a plurality of parameters (FIG. 7(b)), the control unit 8 controls the processing of the first electronic device 1 such that the first electronic device 1 processes the parameters in the following order: the transfer direction code rejection signal portion; the functional code rejection signal portion; and the send data/ receiving processing code rejection signal portion to determine the transfer format.

Next, a procedure for transmitting a control signal again (e.g., more than once) will be described referring to a sequence diagram shown in FIG. 8.

As shown in FIG. 8, a calling (Master) equipment transmits a control signal which defines a communication format in a step S201, and thereafter is switched to a receive mode to be ready to receive a signal from the called (slave) equipment.

Thereafter, if a response signal from the called equipment is not received in a predetermined time (set to 0.25 seconds in this embodiment, but of course can be set to any predetermined time according to the designer's constraints and requirements), the calling (Master) equipment again transmits a control signal having the same contents in step S202. The number of times of retransmitting a control signal is predetermined and in this embodiment, it is set to 10 times. Once again, the number of times of retransmitting a control signal can be freely set according to the designer's needs.

Meanwhile, if the calling (Master) equipment receives a response signal from the equipment with which communication is started within the predetermined time (step S203), a communication format is determined by this response signal, and data communication is started in step S204.

Figure 9:
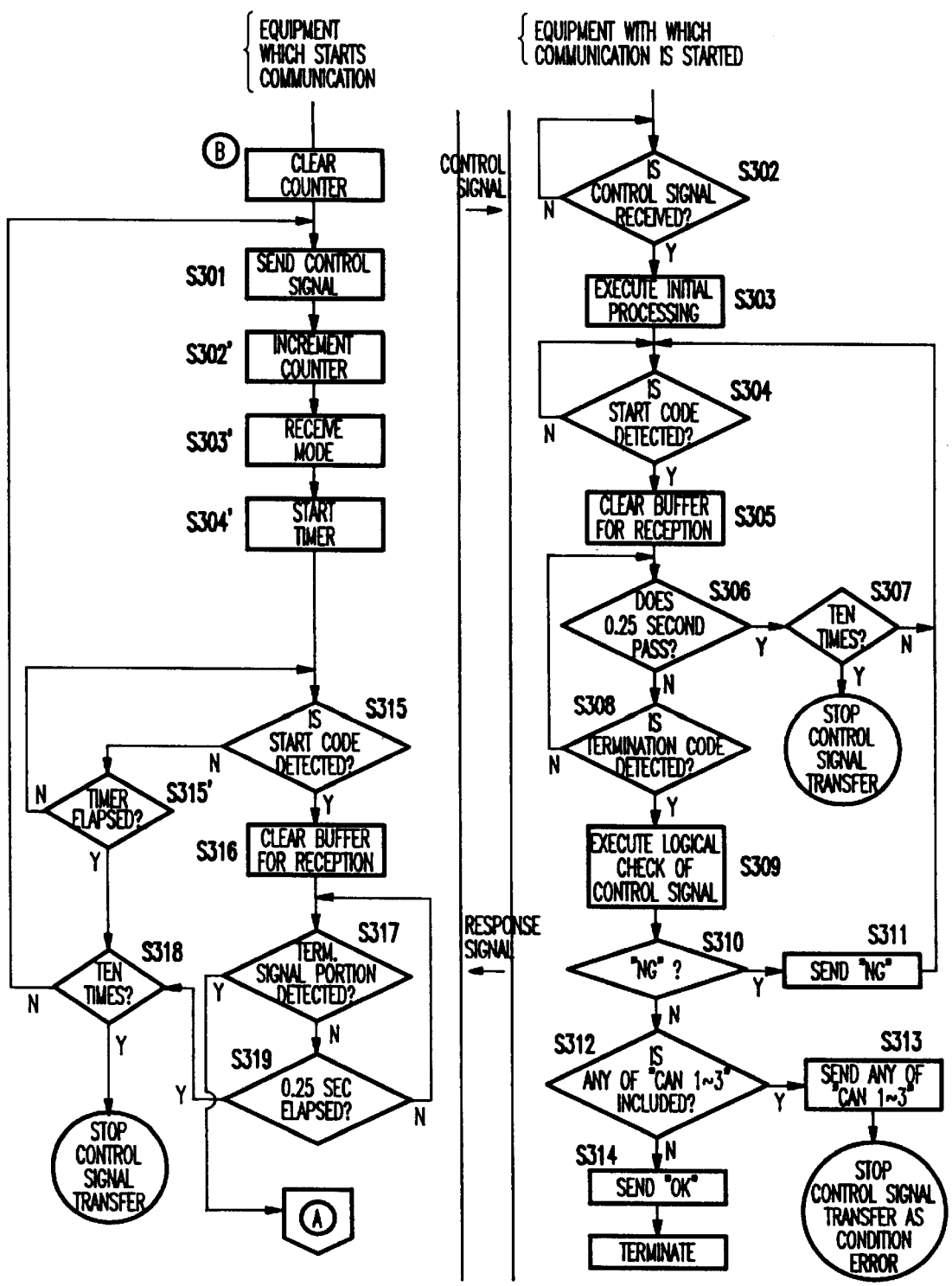
FIG. 9 is a flowchart illustrating a procedure for sending/receiving a control signal and a response signal between the calling equipment and the called equipment according to the present invention.

Next, a procedure for sending or receiving a control signal and a response signal by the calling (Master) equipment and the called (slave) equipment will be described referring to the flowcharts shown in FIGS. 9 and 10.

First, the calling (Master) equipment sends a control signal to the called equipment in a step S301 and the called (slave) equipment judges whether it received the control signal or not in a step S302. Briefly, the slave "judges" that it has received the control signal by the CPU therein getting an interruption signal from the communication interface because the communication interface has detected some data from the receiving element. For example, detection occurs after receipt of the first 10 bytes out of the 60 total bytes. Thus, detection occurs by the switching of one mode to another after receipt of the interruption signal from the communication interface.

When the called (slave) equipment judges it has received the control signal (e.g., a "YES" in step S302), it executes initial processing in a step S303. For example, "initial processing" may include changing the processing mode to run if the CPU is halted, changing the processing clock speed to high if dual speed modes are supported, and/or running a check routine of received data.

Next, in step S304, the called equipment judges whether it has detected the start signal (code) portion of the control signal. When the start signal portion is detected, the called (slave) equipment clears a buffer (e.g., buffer 7 shown in FIG. 2) for reception in step S305.

In steps 306 and 308, the called (slave) equipment judges whether it has detected a termination signal portion of the control signal within 0.25 second after beginning to receive the control signal. Specifically, in step 306 it is determined whether 0.25 second has passed. A timer 80 (shown in FIG. 2) is provided for measuring an elapsed time. If a "NO" is received in this step, then the process proceeds to step S308 in which it is determined if the termination code is detected.

If a "YES" results in step S306, then in step S307, it is determined if 10 attempts (times) have elapsed. If the answer is "NO" in step S307, then the process loops again to step S304. If the determination in step S307 is "YES", then the control signal transfer is stopped.

Thus, this process continues for the predetermined number of times, and the called equipment judges whether the termination signal portion is detected within the predetermined number of times (e.g., 10 times) in step S307. Specifically, with each iteration of the determination, the timer 80 and the counter 81 (shown in FIG. 2) for counting the number of times are actuated, and the counter 81 is incremented by "1" with each iteration.

Moreover, if the termination signal portion is not detected and the number of start signal code detection attempts is less than the predetermined number of times (e.g., 10 times), processing returns to step S304 and to again determine if the start signal portion of the control signal has been detected. If the termination signal is not detected before the predetermined number of time (e.g., 10 times), then control signal transfer is terminated as a data error.

Meanwhile, when the termination signal is detected within the predetermined time in the steps S306 and S308, the logical check of the control signal is executed by the check signal portion of the control signal in step S309.

In this logical check, the called (slave) equipment judges whether an error occurs in the logic of the control signal in step S310 and if an error occurs, an NG signal is added as the parameter of a response signal from the called equipment, and is sent to the calling (Master) in a step S311. For example, an error in the logic of the control signal may include a parity check sum, a cyclic redundancy check (CRC) sum or the like.

If no error occurs in step S310, the called (slave) equipment judges in a step S312 whether a transfer format defined by the parameter portion of the control signal (e.g., the code shown in FIG. 4(B)) is acceptable.

If the called (slave) equipment is unable to receive, a response signal including any parameter of CAN1, CAN2 and CAN3 corresponding to a parameter requested by the calling (Master) equipment is sent to the calling equipment in step S313, and the calling (Master) equipment stops control signal transfer as a condition error.

Meanwhile, in step S312, if the called (slave) equipment judges that reception defined by the control signal is acceptable (e.g., a "NO" in step S312), a response signal including the parameter of an "OK" signal is sent to the calling (Master) equipment in step S314 and processing for receiving the control signal and sending the response signal is terminated.

Incidentally, the calling (Master) equipment is in the wait state for a response signal after it sends a control signal in step S301, and, after incrementing its counter 81 by "1" and being placed in the receive mode and starting its timer 80 therein (steps S302', S303', and S304'), judges whether the start signal of the response signal is detected or not in step S315. When the calling (Master) equipment judges that the start signal is detected, it clears the buffer 7 for reception in step S316.

By the same token, if the start code is not detected in step S315 (e.g., a "NO"), then the timer is checked in step S315' to determine if a predetermined time (e.g., 0.25 second) has elapsed. If not (e.g., a "NO" in step S315'), the process loops again to step S315 to determine if the start code is detected. If the time has elapsed, then the process continues to step S318 as discussed below.

In step S317, the calling (Master) equipment judges whether the termination signal portion of the response signal has been detected. If the judgement is "YES", the process immediately proceeds to process step A shown in FIG. 10 and described in further detail below.

If the judgement is "NO", the process proceeds to step S319 in which it is determined whether a predetermined time (e.g., 0.25 second) of the timer 80 has elapsed.

If a "NO" results (e.g., less than 0.25 second has elapsed) in step S319, the process loops back to step S317 to again determine whether the termination signal portion has been received.

If a "YES" results in step S319, then the process loops to step S318 where it is determined whether ten times (iterations) of sending the control signal (and corresponding detection attempts) have been attempted.

Thus, in steps S317 and S319, the calling (Master) equipment judges whether the termination signal portion of the response signal is detected within 0.25 second (e.g., as determined by timer 80 shown in FIG. 2) after receiving the start code of the response signal. If the termination signal is not detected within the predetermined time, the equipment judges whether the termination signal is detected within a predetermined number of times (e.g., 10) of sending the control signal (continuously or not) in step S318. The counter 81 shown in FIG. 2 is used to count the number of times.

Thus, if a "YES" results in step S319, the process continues to step S318 where it is determined if the predetermined number of times has elapsed. If a "NO" results in step S318 (e.g., the termination signal is not detected, the time is greater than or equal to 0.25 second, and the number of times is less than 10), then processing is returned to step S301 and the control signal is again transmitted to the called (slave) equipment.

If "YES" in step S318 (e.g., if 0.25 second has elapsed and the termination signal is not detected within ten times), then the calling (Master) equipment stops control signal transfer as a data error.

Figure 10:
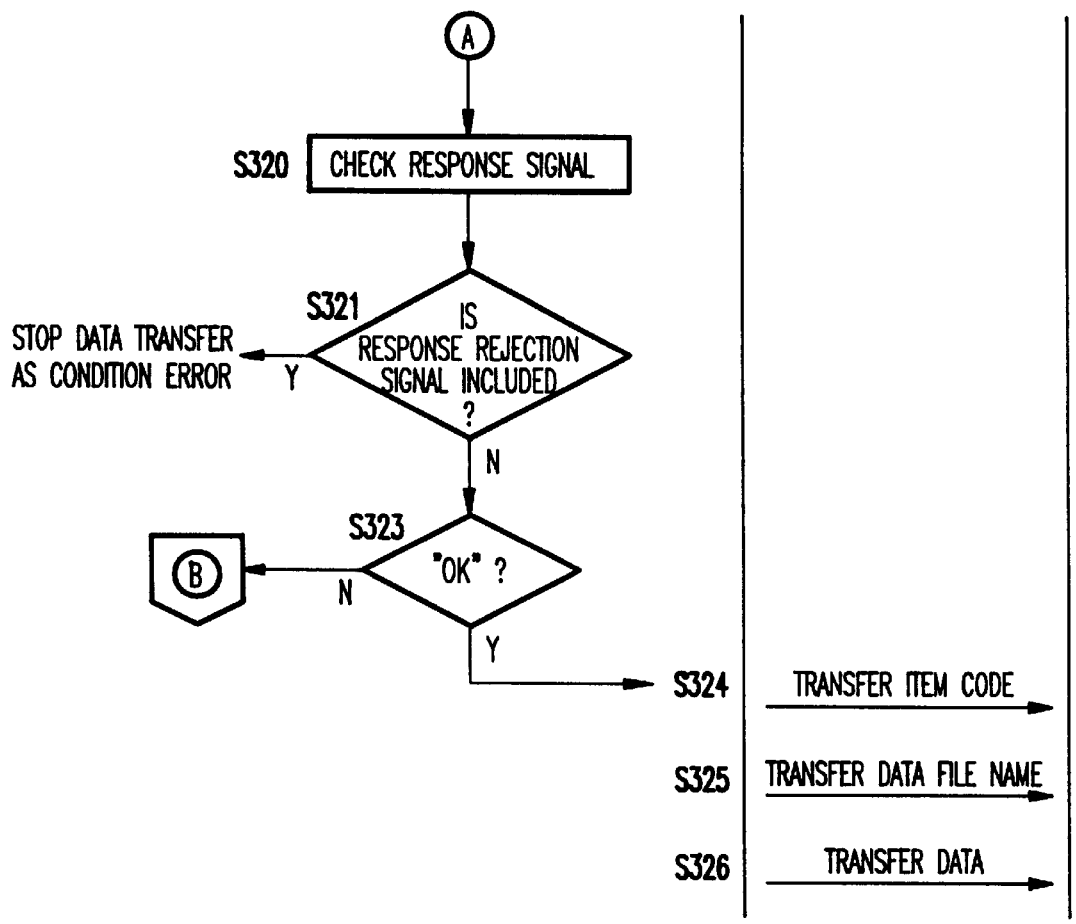
FIG. 10 is a flowchart illustrating a procedure for sending/receiving a control signal and a response signal between the calling equipment and the called equipment according to the present invention.

In the meantime, when the termination signal is detected before the predetermined time has elapsed in the steps S317 and S319, the calling (Master) equipment checks the contents of the parameter of the response signal in step S320, as shown in FIG. 10.

In step S321, the calling (Master) equipment judges whether a response rejection signal, such as a signal showing that the receiving equipment cannot accept a communication format (e.g., an NG signal or CAN3, CAN2, or CAN1), is included as the parameter portion of the response signal.

If any of these signals is determined in step S321 to be included in the response signal, communication is stopped as a communication condition error. Meanwhile, if none of these signals is included in the response signal as determined in step S321 (e.g., a "NO"), it is judged in step S323 whether an OK signal is included as the parameter of the response signal. If not (e.g., a "NO" in step S323, processing returns to step S301.

If an OK signal is included as the parameter of the response signal (e.g., a "YES" in step S323), an item code and a data file name (described below) are transferred, and thereafter data transfer is started in steps S324, S325 and S326.

Hereinbelow, transferring an item code according to the present invention will be described referring to FIGS. 11(A) and 11(B).

When a transfer format is established by sending/receiving a control signal and a response signal between calling (Master) equipment and called (slave) equipment as shown in FIG. 11(A), "m" pieces of first data are continuously sent from the calling (Master) equipment to the called (slave) equipment, where "m" is preferably an integer. This data is defined as "DATA_11", "DATA_12" and "DATA_1m" and after the first data is sent, second data including "m" pieces of data of "DATA_21" to "DATA_2m" is sent. Similarly, data up to nth data is transferred, wherein "n" is an integer greater than "m".

At this time, "DATA_11" of the first data, "DATA_21" of the second data and "DATA_n1" of the nth data are the data of the same item and for example, they respectively show a name defined by an item code FNAM as shown in FIG. 11(B). Similarly, "DATA_12" of the first data, "DATA_22" of the second data and "DATA_n2" of the nth data are also the data of the same item and for example, they respectively show the pronunciation of a name defined by an item code HNAM.

In the present invention, the item code of each data, for example "Title_#1", "Title_#2" to "Title_#m" are sent prior to sending the first data to show these item codes as in FIG. 11(A). Thus, the contents of data to be transferred can be known by the called (slave) equipment before the called (slave) equipment actually receives data transferred from the calling (Master) equipment.

Next, the transfer of a data file name according to the present invention will be described referring to FIGS. 12(A) and 12(B).

When a PRE specifying code is included in the above-described parameter portion of a control signal, the file name of data transferred from the calling (Master) equipment to the called (slave) equipment can be specified beforehand.

In this case, as shown in FIG. 12(A), the information of a data file name "Data_File_Name" and subfile names "Sub_File#1_Name", "Sub_File#2_Name" and others is sent in the order of transmission before data transfer from the calling (Master) equipment to the called (slave) equipment. "denwa. data" showing telephone data as shown in FIG. 12(B), for example, or "kao1. bmp" and "kao2. bmp" showing a person's image (e.g., face etc.), are transferred in a bit-map format, and are respectively put in "Name" in the data file name and the subfile name.

Therefore, the file name of transferred data can be known before the called (slave) equipment receives data transferred from the calling (Master) equipment.

As described above, a data transfer control unit according to the present invention can determine whether communication has been interrupted, or whether communication has been normally terminated, even if the intensity of an IR ray or the like varies depending upon a channel state.

Particularly, since the present invention notifies a data receiving equipment of the name of a transferred file before the data transfer, it can be reliably determined if all data has not been sent when communication is interrupted before all the files are transferred.

Further, since the direction of data transfer is defined by a transfer direction code before data transfer, communication also can be started if data is transferred. Thus, communication is enhanced. That is, communication can be initiated by both sending and receiving equipment. Thus, for communication between equipment which can be operated via a keyboard, such as a personal computer and small electronic equipment, communication can be started by the personal computer. For communication between small electronic equipment, communication can be started by the small equipment readily via a key.

Further, with the invention, since the item of transferred data is defined by an item code or a functional code, a selected part of the data can be transferred, and only data required depending upon the function of each electronic equipment can be transferred. Therefore, the data transfer time can be reduced by not having to send unnecessary data, and the battery of the small electronic equipment will have decreased consumption and thus a longer service life.

Moreover, since the data items to be transferred are notified to the receiving equipment before the actual data transfer, when data transfer is interrupted it is readily known that all data has not been sent. Thus, reliable communication results. Further, since the general contents of the data to be transferred is sent beforehand, the data received by the receiving equipment can be readily processed.

Additionally, with the invention, if it is unknown whether another device has data containing specific item codes, the sending equipment can also send any or selected data of the corresponding function of the equipment. Specifically, the sending equipment may start communication by specifying only a functional code, and inform the receiving equipment of the items to be transferred before data transfer actually begins. Thus, the receiving equipment can fetch only required data items.

Further, since the calling (Master) equipment can issue a transmission range code as to whether the data to be sent is a data portion or the entire data, the receiving equipment can determine how to treat the data. Since the range of required data can be specified, for example, it can be specified whether all of the data or only new data if the calling (Master) equipment receives, and the quantity of transferred data can be reduced.

Further, since the processing of transferred data by the receiving equipment can be defined by a receiving processing code, the character of transferred data can be defined by the sending equipment, and data can be sent with the relationship between old data stored in the receiving equipment and data to be transferred defined by the sending equipment. Specifically, data synchronization results in that the Master sends additional data to the slave. The transmitter returns old data to the Master. The Master compares the data and deletes the old data.

Further, since a control signal is retransmitted for a predetermined number of times when no response signal is received within a predetermined time, a communication format can be established without the calling equipment operating again even if the communication environment is poor.

Additionally, since data itself will be transferred to delete the data with the "-DELETE" parameter in the "receiving processing code", there are no mistakes in deleting different data as in when data is deleted simply by referring to the data ID. Thus, the invention overcomes the problem of duplicate unique IDs mentioned above with regard to the conventional systems. Specifically, the invention identifies the data itself, not the IDs. For example, in making its determination, the invention may compare time stamps.

While the invention has been described in terms of a single preferred embodiment, those skilled in the art will recognize that the invention can be practiced with modification within the spirit and scope of the appended claims.

For example, the present invention is not limited to an IR communication medium but is also applicable to communication using radio waves (RF) and wire communication.

Having thus described our invention, what we claim as new and desire to secure by Letters Patent is as follows:

1. A data transfer control unit for controlling a data transfer between a first device and a second device, comprising:

a control signal sending unit for sending, from said first device to said second device, a control signal for informing said second device of a data transfer format; and a response signal sending unit for sending, from said second device to said first device, a response signal for defining whether said data transfer format defined by said control signal has a predetermined state, wherein said predetermined state includes whether said data transfer format is acceptable to said second device, wherein said control signal sending unit sends at least one of:

a transfer direction code for defining a direction of data transfer;

an item code for defining the item of transferred data;

a functional code for defining a set of items of said transferred data;

a transmission range code for defining a range of said transferred data;

a receiving processing code for defining a processing for said transferred data of said second device; and a PRE specifying code for specifying whether a file name of said transferred data has been previously sent, wherein said response signal sending unit sends at least one of:

a send data rejection signal portion representing that a range of data defined by said transmission range code is unacceptable;

a receiving processing code rejection signal portion representing that a receiving processing defined by said receiving processing code is unacceptable;

a functional code rejection signal portion representing that said set of data items defined by said functional code is unacceptable; and a transfer direction code rejection signal portion representing that a direction of transfer defined by said transfer direction code is unacceptable, said data transfer control unit, further comprising a controller for controlling a processing by said first device, wherein, when said response signal comprises a plurality of signal portions, said controller controls said processing by said first device such that said first device processes in an order of said transfer direction code rejection signal portion, said functional code rejection signal portion and said send data/receiving processing code rejection signal portion to determine said transfer format.

2. A data transfer control unit according to claim 1, further comprising:

a first logic unit for determining whether said first device has received said response signal; and a second logic unit for determining a time elapsed from a time at which said control signal is sent by said control signal sending unit.

3. A data transfer control unit according to claim 2, wherein, when said first logic unit determines that said first device has not received said response signal within a predetermined time as determined by said second logic unit, said control signal is resent by said control signal sending unit.

4. A data transfer control unit according to claim 3, wherein said control signal is resent for a predetermined number of times, and wherein if said first logic unit determines that no response signal has been received by said first device, said data transfer is terminated.

5. A data transfer control unit according to claim 1, wherein said control signal sending unit sends a control signal including a code for defining whether a file name of said data to be transferred has been sent.

6. A data transfer control unit for transferring data via a medium, between a first device and a second device, comprising:
   a control signal sending unit for sending, from said first device to said second device, a control signal for informing said second device of a data transfer format prior to data transfer; and
   a response signal sending unit for sending, from said second device to said first device, a response signal for representing whether reception in said data transfer format defined by said control signal has a predetermined state,
   wherein said control signal includes a code for defining data to be transferred,
   wherein said predetermined state includes whether said data transfer format is acceptable to said second device,
   wherein said control signal sending unit sends at least one of:
      a transfer direction code for defining a direction of data transfer;
      an item code for defining the item of transferred data;
      a functional code for defining a set of items of said transferred data;
      a transmission range code for defining a range of said transferred data;
      a receiving processing code for defining a processing for said transferred data of said second device; and
      a PRE specifying code for specifying whether a file name of said transferred data has been previously sent,
   wherein said response signal sending unit sends at least one of:
      a send data rejection signal portion representing that a range of data defined by said transmission range code is unacceptable;
      a receiving processing code rejection signal portion representing that a receiving processing defined by said receiving processing code is unacceptable;
      a functional code rejection signal portion representing that said set of data items defined by said functional code is unacceptable; and
      a transfer direction code rejection signal portion representing that a direction of transfer defined by said transfer direction code is unacceptable,
   said data transfer control unit, further comprising a controller for controlling a processing by said first device,
   wherein, when said response signal comprises a plurality of signal portions, said controller controls said processing by said first device such that said first device processes in an order of said transfer direction code rejection signal portion, said functional code rejection signal portion and said send data/receiving processing code rejection signal portion to determine said transfer format.

7. A data transfer control unit according to claim 6, wherein said medium comprises one of infrared, radio and wire communication means.

8. A data transfer control unit according to claim 6, further comprising:
   first logic unit for determining whether said first device has received said response signal; and
   second logic unit for determining a time elapsed from a time at which said control signal is sent by said control signal sending means,
   wherein, when said first logic unit determines that said first device has not received said response signal within a predetermined time as determined by said second logic unit, said control signal is resent by said control signal sending means.

9. A data transfer according to claim 6, wherein said code for defining transferred data is sent before said data is transferred.

10. A data transfer control unit according to claim 6, wherein said control signal sending unit sends a control signal including a second code for defining whether a file name of said data to be transferred has been sent.

11. A data transfer control unit for transferring data including at least one file between a first device and a second device, via a medium, comprising;
   a device for sending, from one of said first device and said second device, a file identifier included in said data to the other of one of said first device and said second device, prior to data transfer,
   wherein said file identifier defines whether said data transfer format is acceptable to said second device,
   wherein said device for sending sends at least one of:
      a transfer direction code for defining a direction of data transfer;
      an item code for defining the item of transferred data;
      a functional code for defining a set of items of said transferred data;
      a transmission range code for defining a range of said transferred data;
      a receiving processing code for defining a processing for said transferred data of said second device; and
      a PRE specifying code for specifying whether a file name of said transferred data has been previously sent,
   wherein said device for sending sends at least one of:
      a send data rejection signal portion representing that a range of data defined by said transmission range code is unacceptable;
      a receiving processing code rejection signal portion representing that a receiving processing defined by said receiving processing code is unacceptable;
      a functional code rejection signal portion representing that said set of data items defined by said functional code is unacceptable; and
      a transfer direction code rejection signal portion representing that a direction of transfer defined by said transfer direction code is unacceptable,
   said data transfer control unit, further comprising a controller for controlling a processing by said first device,
   wherein, when said response signal comprises a plurality of signal portions, said controller controls said processing by said first device such that said first device processes in an order of said transfer direction code rejection signal portion said functional code rejection signal portion and said send data/receiving processing code rejection signal portion to determine said transfer format.

12. A method of controlling data transfer between a first device and a second device, comprising:
sending, from said first device to said second device, a control signal for informing said second device of a data transfer format; and
sending, from said second device to said first device, a response signal for defining whether said data transfer format defined by said control signal has a predetermined state,
wherein said predetermined state includes whether said data transfer format is acceptable to said second device, and
wherein said sending of said control signal includes sending at least one of:
a transfer direction code for defining a direction of data transfer;
an item code for defining the item of transferred data;
a functional code for defining a set of items of said data;
a transmission range code for defining a range of said transferred data;
a receiving processing code for defining a processing for said transferred data of said called device; and
a PRE specifying code for specifying whether a file name of said transferred data has been previously sent,
wherein said sending of said response signal includes sending at least one of:
a send data rejection signal portion representing that a range of data defined by said transmission range code is unacceptable;
a receiving processing code rejection signal portion representing that a receiving processing defined by said receiving processing code is unacceptable;
a functional code rejection signal portion representing that said set of data items defined by said functional code is unacceptable; and
a transfer direction code rejection signal portion representing that a direction of transfer defined by said transfer direction code is unacceptable,
said method, further comprising processing by said first device after receiving said response signal,
wherein when said response signal comprises a plurality of signal portions, said processing by said first device includes processing in an order of said transfer direction code rejection signal portion, said functional code rejection signal portion and one of said send data rejection signal portion and said receiving processing code rejection signal portion, to determine said transfer format.

13. A method according to claim 12, further comprising measuring a time after said step of sending said control signal by said first device.

14. A method according to claim 13, further comprising detecting whether a response signal has been received by said first device from said second device.

15. A method according to claim 14, further comprising resending said control signal by said first device for a predetermined number of times when it is detected that said first device has not received said response signal within a predetermined time.

16. A data transfer control unit for controlling a data transfer between a first device and a second device, comprising:
a control signal sending unit for sending, from said first device to said second device, a control signal for informing said second device of a data transfer format; and
a response signal sending unit for sending, from said second device to said first device, a response signal for defining whether said data transfer format defined by said control signal has a predetermined state,
wherein said predetermined state includes whether said data transfer format is acceptable to said second device,
wherein said control signal sending unit sends at least one of:
a transfer direction code for defining a direction of data transfer;
an item code for defining the item of transferred data;
a functional code for defining a set of items of said transferred data;
a transmission range code for defining a range of said transferred data;
a receiving processing code for defining a processing for said transferred data of said second device; and
a PRE specifying code for specifying whether a file name of said transferred data has been previously sent,
wherein said response signal sending unit sends at least one of:
a send data rejection signal portion representing that a range of data defined by said transmission range code is unacceptable;
a receiving processing code rejection signal portion representing that a receiving processing defined by said receiving processing code is unacceptable;
a functional code rejection signal portion representing that said set of data items defined by said functional code is unacceptable; and
a transfer direction code rejection signal portion representing that a direction of transfer defined by said transfer direction code is unacceptable,
said data transfer control unit, further comprising a controller for controlling a processing by said first device,
wherein, when said response signal comprises a plurality of signal portions, said controller controls said processing by said first device such that said first device processes in an order of said transfer direction code rejection signal portion, said functional code rejection signal portion and said send data/receiving processing code rejection signal portion to determine said transfer format.

17. A data transfer control unit for transferring data via a medium, between a first device and a second device, comprising:
a control signal sending unit for sending, from said first device to said second device, a control signal for informing said second device of a data transfer format; and
a response signal sending unit for sending, from said second device to said first device, a response signal for defining whether said data transfer format defined by said control signal has a predetermined state,
wherein said predetermined state includes whether said data transfer format is acceptable to said second device, and
wherein said control signal includes a code for defining data to be transferred,
wherein said control signal sending unit sends at least one of:
a transfer direction code for defining a direction of data transfer;
an item code for defining the item of transferred data;

a functional code for defining a set of items of said transferred data;

a transmission range code for defining a range of said transferred data;

a receiving processing code for defining a processing for said transferred data of said second device; and a PRE specifying code for specifying whether a file name of said transferred data has been previously sent, wherein said response signal sending unit sends at least one of:

a send data rejection signal portion representing that a range of data defined by said transmission range code is unacceptable;

a receiving processing code rejection signal portion representing that a receiving processing defined by said receiving processing code is unacceptable;

a functional code rejection signal portion representing that said set of data items defined by said functional code is unacceptable; and a transfer direction code rejection signal portion representing that a direction of transfer defined by said transfer direction code is unacceptable, said data transfer control unit, further comprising a controller for controlling a processing by said first device, wherein, when said response signal comprises a plurality of signal portions, said controller controls said processing by said first device such that said first device processes in an order of said transfer direction code rejection signal portion, said functional code rejection signal portion and said send data/receiving processing code rejection signal portion to determine said transfer format.

* * * * *